(12) United States Patent
Sato et al.

(10) Patent No.: US 7,321,361 B2
(45) Date of Patent: Jan. 22, 2008

(54) COORDINATE INPUT DEVICE HAVING NON-FLAT OPERATION SURFACE AND ELECTRONIC APPARATUS

(75) Inventors: Tadamitsu Sato, Fukushima-ken (JP); Masahiro Soma, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 241 days.

(21) Appl. No.: 10/244,702

(22) Filed: Sep. 16, 2002

(65) Prior Publication Data
US 2003/0071784 A1   Apr. 17, 2003

(30) Foreign Application Priority Data
Sep. 17, 2001   (JP)   ............... 2001-282442

(51) Int. Cl.
*G06F 3/041* (2006.01)
(52) U.S. Cl. ........................... 345/173; 345/174
(58) Field of Classification Search ................ 345/165, 345/167, 169, 156, 157, 163, 173, 174
See application file for complete search history.

(56) References Cited

U.S. PATENT DOCUMENTS

| | | | |
|---|---|---|---|
| 4,084,451 A * | 4/1978 | Ward ........................... 477/69 |
| 4,550,221 A | 10/1985 | Mabustch ................. 178/18.01 |
| 5,367,199 A * | 11/1994 | Lefkowitz et al. .......... 307/116 |
| 5,691,747 A * | 11/1997 | Amano ........................ 345/167 |
| 5,805,137 A | 9/1998 | Yasutake ................. 178/18.01 |
| 5,942,733 A | 8/1999 | Allen et al. .................. 345/156 |
| 5,995,083 A | 11/1999 | Sato et al. |
| 6,072,475 A | 6/2000 | van Ketwich ............... 345/173 |
| 6,094,190 A * | 7/2000 | Kodim ......................... 345/167 |
| 6,369,803 B2 * | 4/2002 | Brisebois et al. ............ 345/173 |
| 6,535,201 B1 * | 3/2003 | Cooper et al. .............. 345/173 |
| 6,620,454 B2 * | 9/2003 | Varaprasad et al. ......... 427/164 |
| 6,842,015 B2 * | 1/2005 | Morimoto .................... 324/662 |
| 2001/0000125 A1 * | 4/2001 | Zimmerman et al. ....... 345/161 |
| 2002/0149566 A1 * | 10/2002 | Sarkissian .................... 345/168 |
| 2004/0017355 A1 * | 1/2004 | Shim .......................... 345/157 |

FOREIGN PATENT DOCUMENTS

| | | |
|---|---|---|
| EP | 0 660 258 | 6/1995 |
| JP | 07160396 A * | 6/1995 |
| WO | WO 01/35328 | 5/2001 |

* cited by examiner

*Primary Examiner*—Ricardo Osorio
(74) *Attorney, Agent, or Firm*—Brinks Hofer Gilson & Lione (57) ABSTRACT

A coordinate input device includes a coordinate input unit which performs a coordinate input operation by sliding an operating member on an operation surface which is formed in a convex shape, a concave shape, or the shape of a polyhedron. More specifically, the coordinate input device includes a capacitive sensor substrate formed by laminating two electrode layers with an upper substrate (dielectric layer) therebetween, each electrode layer including a plurality of electrodes arranged in a striped pattern. In addition, the coordinate input device also includes the operation surface formed in a convex (or concave) shape which is used for performing a coordinate input operation by sliding the operating member thereon.

7 Claims, 10 Drawing Sheets

COORDINATE INPUT DEVICE HAVING NON-FLAT OPERATION SURFACE AND ELECTRONIC APPARATUS

BACKGROUND OF THE INVENTION

1. Field of the Invention

The present invention relates to coordinate input devices used in electronic apparatuses such as computers, mobile phones or game devices for moving a cursor or a character, selecting a function, etc., on a display, and also relates to electronic apparatuses including the coordinate input devices.

2. Description of the Related Art

Figure 15:
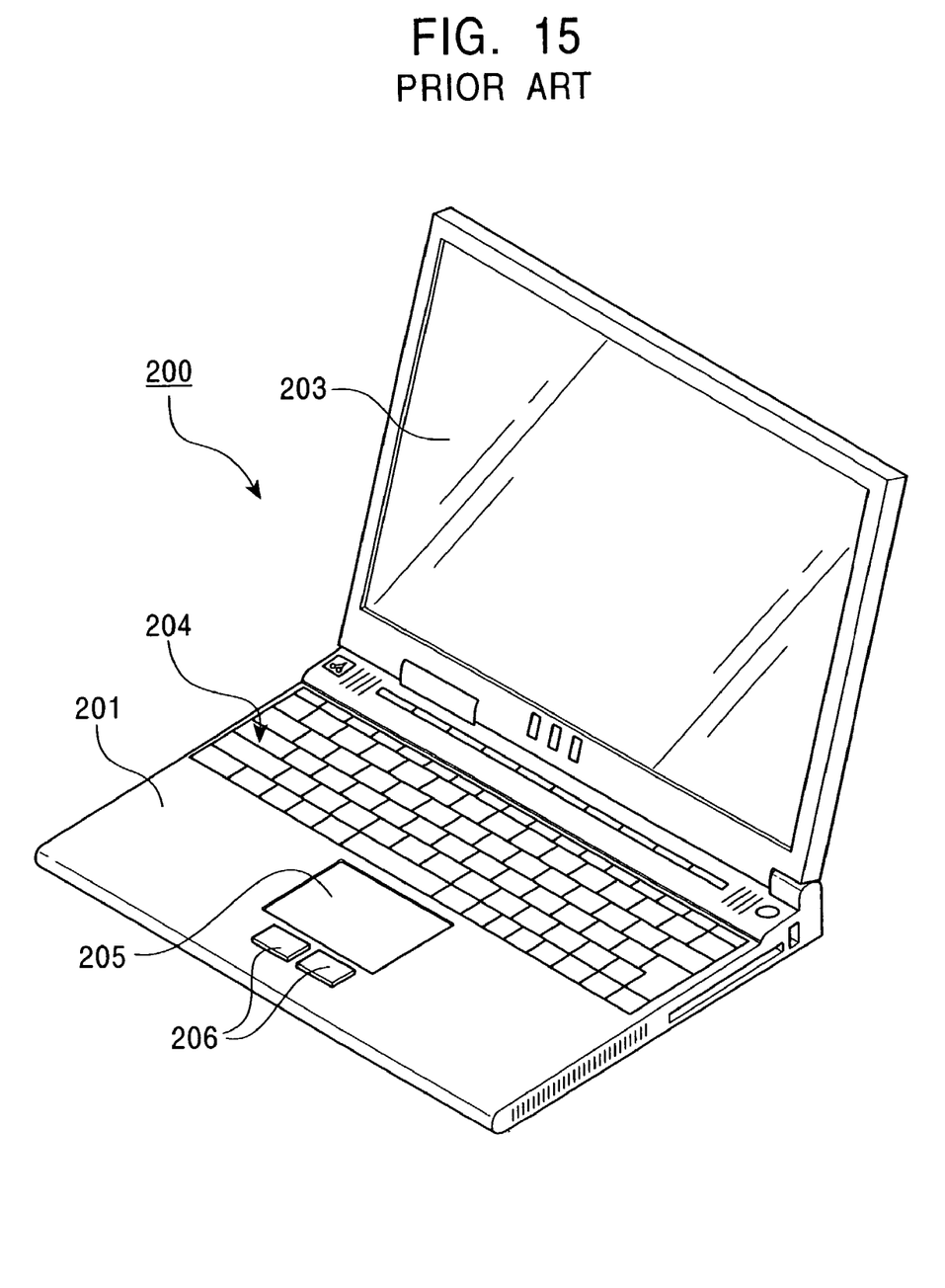
FIG. 15 is a perspective view showing a notebook personal computer including a touch pad as an example of a known coordinate input device.

FIG. 15 is a perspective view of a notebook personal computer having a coordinate input device called a touch pad in front of a keyboard. This computer 200 includes a main body 201 and a display 203 which is connected to the main body 201 by a hinge at the rear end of the main body 201. A keyboard 204, a touch pad (coordinate input device) 205, and operation buttons 206 are provided on the top surface of the main body 201. The touch pad 205 has a flat, rectangular shape and is disposed in front of the keyboard 204, and the operation buttons 206 are disposed in front of the touch pad 205. The touch pad 205 is constructed such that a cursor, etc., that could be seen on the display 203 can be operated by sliding an operating member, for example, a finger, on the touch pad 205.

By using the above-described touch pad 205, a coordinate input operation, for example, an operation of moving a cursor., can be performed without moving one's hands from their home positions on the keyboard 204. In addition, since the touch pad 205 is flat, a thin, space saving computer can be obtained.

However, when the above-described flat touch pad 205 is used, since the coordinate input operation is performed by moving a finger on the touch pad 205, there is a problem in that it is difficult for the user to feel the sense of cursor movement compared to when other input devices such as computer mice are used, and a satisfactory operational feel cannot be obtained.

On the other hand, other notebook personal computers having rotating ball devices (trackball devices) instead of the touch pad 205 shown in FIG. 15 are also known. In such computers, the curser is moved by rotating a ball contained in the rotating ball device. Accordingly, the user can easily obtain the sense of cursor movement by feeling the rotation of the ball with his or her finger, so that the coordinate input operation can be easily performed. However, in order to install the rotating ball device in the computer, a space corresponding to the diameter of the ball must be provided inside the main body of the computer. Therefore, there is a problem that it is difficult to reduce the thickness of the computer.

SUMMARY OF THE INVENTION

Accordingly, in order to solve the above-described problems, an object of the present invention is to provide a coordinate input device with which coordinate input operation can be easily performed with an excellent operational feel, and to provide an electronic apparatus using the coordinate input device.

In order to attain the above-described objects, the following constructions are used in the present invention.

A coordinate input device according to the present invention includes a coordinate input unit which performs a coordinate input operation by detecting a position of an operating member on a non-rotating operation surface when the operating member slides on the operation surface, wherein the operation surface is formed in a convex shape, a concave shape, or the shape of a polyhedron.

In the coordinate input device according to the present invention, since the operation surface is formed in a concave shape, a convex shape, or the shape of a polyhedron, the user can recognize the amount and direction of movement of a finger which slides on the operation surface. Accordingly, the coordinate input operation can be performed more finely, and an excellent operational feel can be obtained.

In addition, the coordinate input unit of the coordinate input apparatus according to the present invention includes a capacitive sensor substrate which is formed in a concave shape, a convex shape, or the shape of a polyhedron, and which includes a dielectric layer and two electrode layers which are laminated with the dielectric layer therebetween, each electrode layer having a plurality of electrodes arranged in a pattern.

More specifically, the coordinate input apparatus according to the present invention is constructed by forming an operation surface of a capacitive coordinate input device in a concave shape, a convex shape, or the shape of a polyhedron. The coordinate input operation is performed by sliding the operating member, for example, a finger, on the top surface of the operation surface. Since the user can recognize the amount and direction of movement of the finger which slides on the operation surface, the coordinate input operation can be performed more finely. Therefore, an excellent operational feel can be obtained. In other words, the coordinate input device according to the present invention provides an operating feel equivalent to that of the rotating ball device, and is as space saving as capacitive coordinate input devices.

In addition, the coordinate input device according to be the present invention may be a contact coordinate input devices in which a pair of substrates provided with electrode layers on surfaces opposing each other are laminated with a spacer therebetween. Also in this case, effects similar to those obtained by the above-described coordinate input device are also obtained.

According to another aspect of the present invention, a coordinate input device includes a coordinate input unit which performs a coordinate input operation by detecting a pushing force and a sliding direction of an operating member when the operating member slides on an operation surface. The coordinate input means includes a detection sensor unit and an operation unit disposed on the detection sensor unit, the top surface of the operation unit being formed in a concave shape, a convex shape, or the shape of a polyhedron, and the coordinate input means detects the pushing force applied to the operation unit by using the detection sensor unit and outputs a detection signal corresponding to the pushing force.

In the coordinate input device which is constructed as described above, a coordinate input unit detects the pushing force applied to the operation unit by using the detection sensor unit. Also when the coordinate input device is constructed as described above, similarly to the above-described capacitive coordinate input device, an operating feel equivalent to that of the rotating ball device can be obtained. In addition, since a heavy ball used in the rotating ball device is not necessary, the weight of an electronic apparatus in which the coordinate input device is mounted can be reduced.

In addition, the above-described coordinate input device may be constructed such that a plurality of strain gauges are radially disposed around the center of the bottom surface of the operation unit at a constant angular interval. In this construction, the strain gauges are used as a coordinate detecting unit of the detection sensor unit used for detecting the coordinate input.

As described above, according to the coordinate input device of the present invention, the coordinate input operation is performed by sliding the operating member on a capacitive sensor substrate, and the operation surface for sliding the operating member is formed in a concave shape, a convex shape, or the shape of a polyhedron. Accordingly, the user obtains not only the sense of two-dimensional movement but also the sense of vertical movement along the curved surface from his or her finger sliding on the operation surface. Thus, the amount and direction of finger movement can be easily recognized, so that the coordinate input operation can be performed more finely and an excellent operational feel can be obtained. In other words, the coordinate input device according to the present invention provides an operating feel equivalent to that of the rotating ball device, and is as space saving as capacitive coordinate input devices.

Furthermore, an electronic apparatus according to the present invention includes one of the above-described coordinate input devices. By using the coordinate input device of the present invention, with which the coordinate input operation can be easily performed with an excellent operational feel, as an operation unit for the coordinate input operation, the operability of the electronic apparatus can be improved.

BRIEF DESCRIPTION OF THE DRAWINGS

FIGS. 2A-2C are exploded perspective views of a sensor substrate shown in FIG. 1; and specifically.

DESCRIPTION OF THE PREFERRED EMBODIMENTS

Embodiments of the present invention will be described below with reference to the accompanying drawings. However, the present invention is not limited to the following embodiments.

First Embodiment

Figure 1:
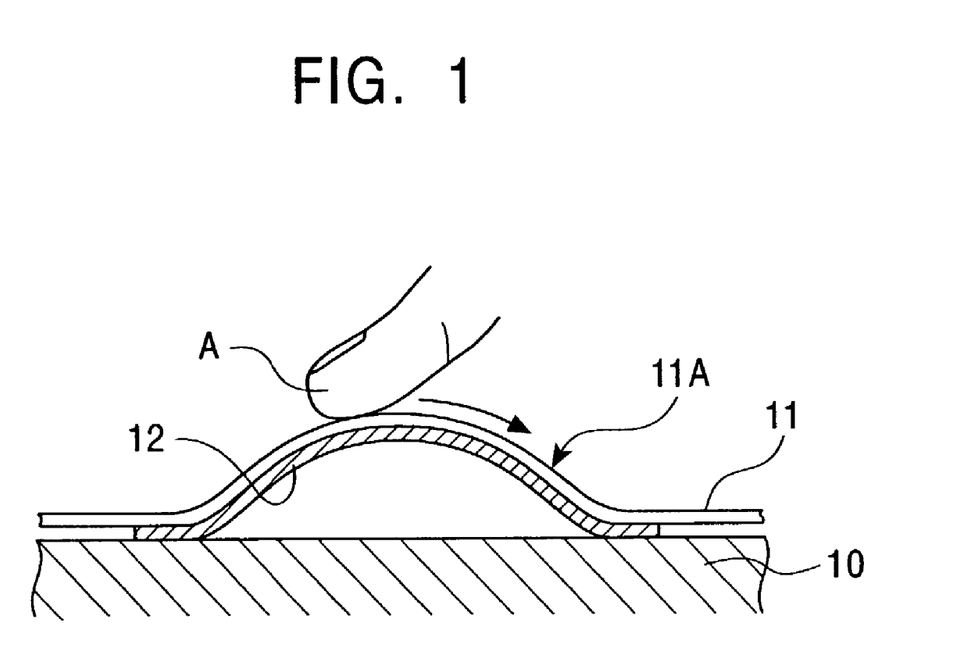
FIG. 1 is a sectional view showing a coordinate input device according to a first embodiment of the present invention.

FIG. 1 shows a sectional view of a coordinate input device according to a first embodiment of the present invention. The coordinate input device shown in the figure includes a cover 11 and a sensor substrate 12. The cover 11 has a convex portion 11A and is formed on a base 10, and the sensor substrate 12 has the shape corresponding to the convex portion 11A and is laminated on the bottom surface of the convex portion 11A (surface facing the base 10) of the cover 11.

Figure 3A:
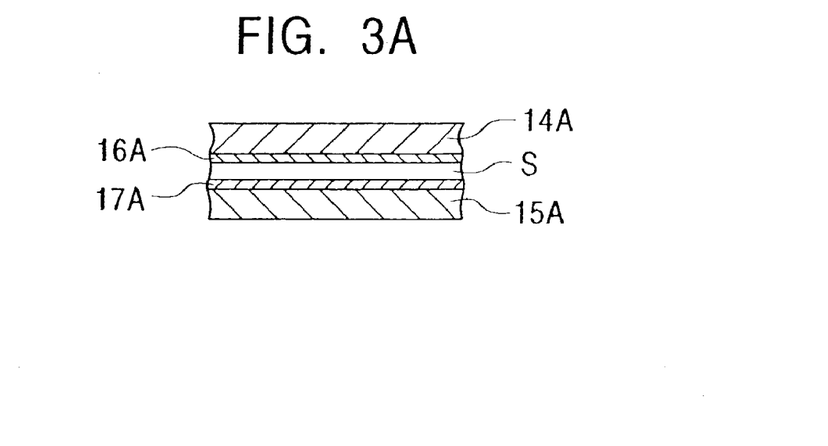
FIG. 3A is a cross section view of a contact coordinate input device having a pair of substrates provided with electrode layers on opposing surfaces and there is a spacer therebetween.
Figure 3B:
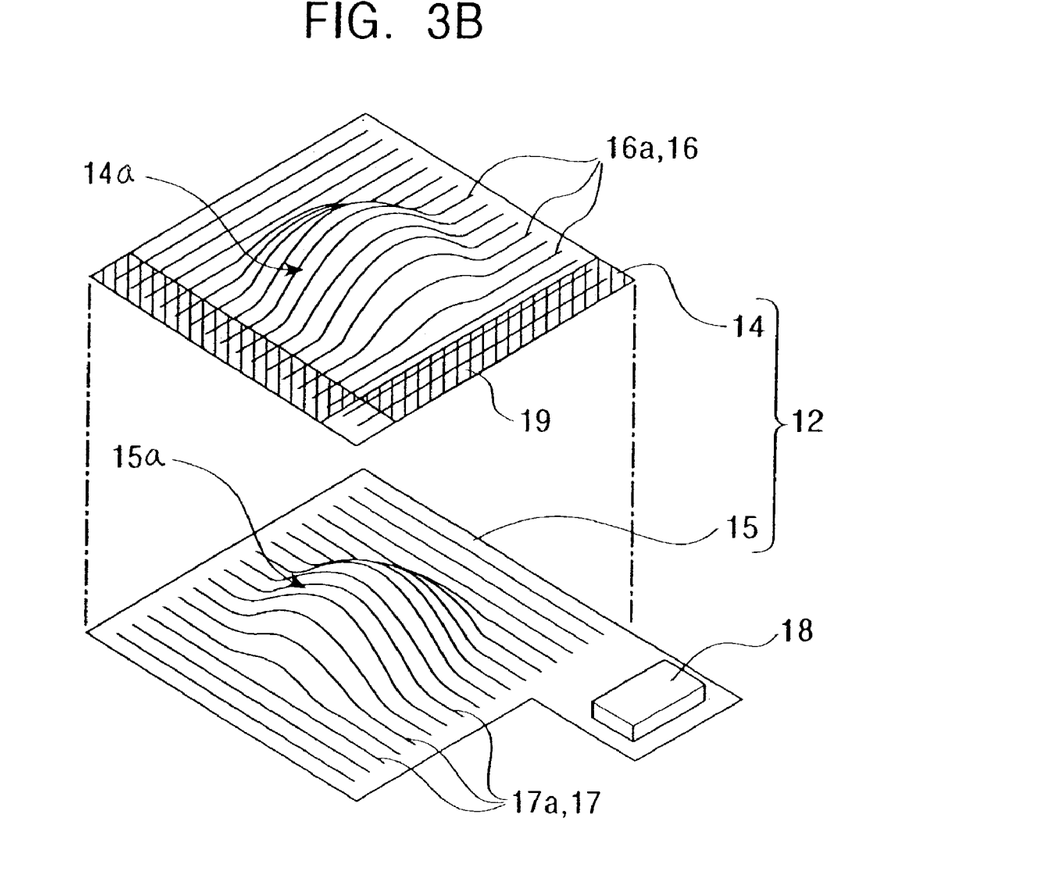
FIG. 3B is a perspective view showing a coordinate input device according to a first embodiment.

As shown in FIG. 3B, the sensor substrate 12 is formed by laminating an upper substrate 14 and a lower substrate 15. The upper substrate 14 is provided with an electrode layer 16 on the top surface thereof (that is, the surface facing opposite to the lower substrate 15). As shown in FIG. 3B, the electrode layer 16 includes a plurality of line electrodes 16a arranged parallel to each other in a striped pattern in a plan view. In addition, the lower substrate 15 is provided with an electrode layer 17 on the top surface thereof. The electrode layer 17 includes a plurality of electrodes 17a arranged parallel to each other and perpendicularly to the electrodes 16a in a striped pattern in a plan view. At least the upper substrate 14 is formed of a dielectric material, so that the electrode layers 16 and 17 are insulated from each other.

A control circuit 18 for driving the electrode layers 16 and 17 is disposed on a substrate formed by extending the lower substrate 15 at one end thereof. Although not shown in FIG. 3B, the electrodes 16a and 17a are connected to the control circuit 18 by electric wires.

Figure 2A:
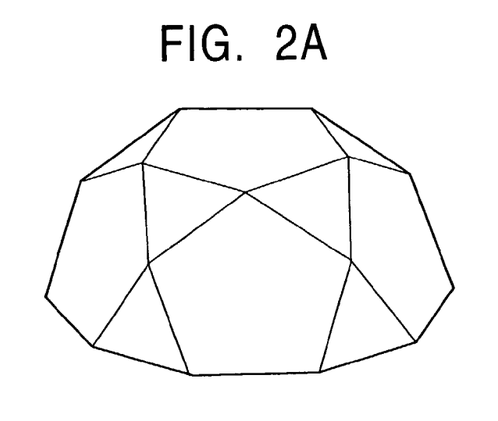
FIG. 2A is a perspective view of an operation surface having a polyhedron shape.
Figure 2B:
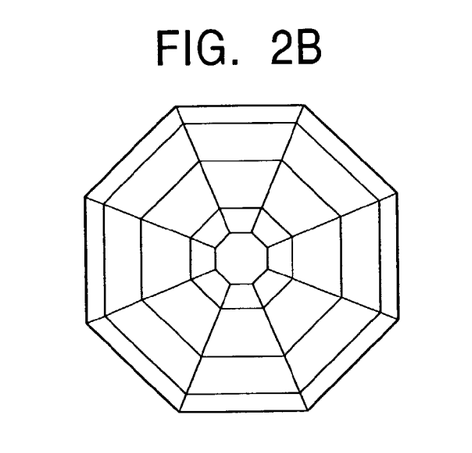
FIG. 2B is a plan view of an operation surface having a polyhedron shape with flat regions at the periphery thereof.
Figure 2C:
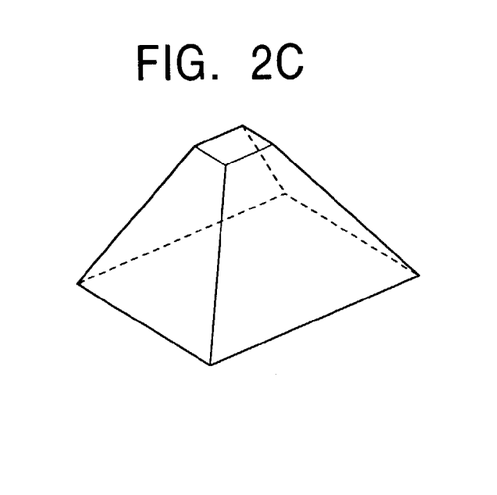
FIG. 2C is a perspective view of an operative surface in which the periphery is formed in a rectangular shape and the sides are straight.

The upper substrate 14 and the lower substrate 15 include a convex portion 14a and a convex portion 15a, respectively, at the central position thereof The convex portions 14a and 15a are curved upward in FIG. 3B in shapes such that the substrate 12 formed by laminating the upper and lower substrates 14 and 15 can be closely attached on the bottom surface of the convex portion 11A of the cover 11 shown in FIG. 1. The convex portion of the sensor substrate 12 may be formed by laminating the substrates 14 and 15 having convex portions as described above. Alternatively, the convex portion may be formed after the upper substrate 14 and the lower substrate 15 are laminated by pressure forming, etc. In addition, although the convex portions 14a and 15a are formed in a convex shape, they may also be formed in the shape of a polyhedron obtained by, for example, cutting out the upper half of an icosahedron. One example of polyhedron shape that could be used is illustrated in FIG. 2A. A polyhedron shape having flat regions at the periphery thereof is illustrated in FIG. 2B and a polyhedron shape in which the periphery of the operating surface is formed in a rectangular shape and the sides are straight is illustrated in FIG. 2C.

In the coordinate input device having the above-described construction, the top surface of the convex portion 11A of the cover 11 as shown in FIG. 1 is used as an operation surface, and the change in capacitance between the electrode layers 16 and 17 caused by sliding an operating member A, such as a finger, on the operation surface is output as a detection signal.

Figure 14:
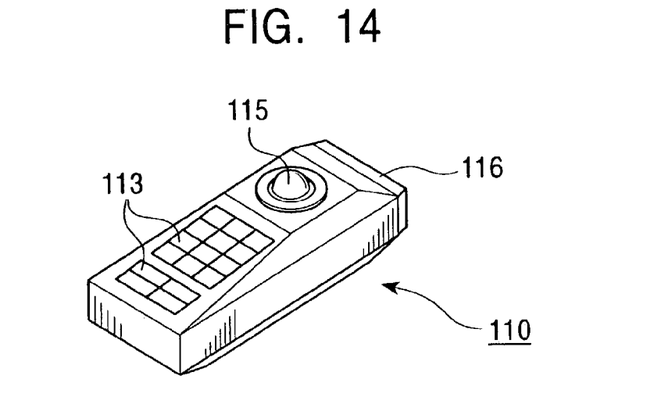
FIG. 14 is a diagram showing a remote controller as another example of an electronic apparatus according to the present invention.

In the coordinate input device of the present invention, the coordinate input operation is performed by sliding a finger on the surface of the convex portion 11A which serves as the operation surface. Accordingly, the sliding friction applied to the user's finger during sliding is larger than that applied when the known, flat touch pad 205 shown in FIG. 14 is used. More specifically, not only the sense of two-dimensional movement caused by moving the finger along the flat surface, but also the sense of vertical movement caused by moving the finger along the convex surface can be obtained at the same time. Accordingly, the user can more reliably feel the subtle sense of coordinate input operation compared to the case in which the known, flat touch pad is used.

More specifically, when, for example, the known touch pad 205 is used in a computer for moving a cursor, the finger is merely moved along the flat surface, so that the user hardly feels the sense of cursor movement from the finger. Even when the user can feel the sense of cursor movement, it includes only the sense of two-dimensional movement. Accordingly, it is extremely difficult to finely control the amount and direction of cursor movement on the basis of the feel of the finger. On the contrary, according to the coordinate input device of the present invention, since the finger slides on the operation surface having a convex shape, the amount and direction of cursor movement can be recognized on the basis of finger movement in the vertical direction in addition to the two-dimensional movement. Thus, the user can easily recognize the position of his or her finger touching the operation surface. Therefore, the user can easily follow the amount and direction of cursor movement in accordance with the amount and direction of finger movement, and the cursor can be controlled more finely. Accordingly, the operational feel of the coordinate input device can be greatly improved, and therefore the operational feel of the computer can also be improved.

The coordinate input device according to the present embodiment facilitates a coordinate input operation for an extremely small amount of movement, for example, an operation of finely adjusting a cursor position. Since the operation surface is formed in a convex shape, when the user moves his or her finger along the operation surface, the user can easily recognize the amount by which the user has moved his or her finger on the operation surface even if the amount of movement is small. Accordingly, fine position adjustment can be performed on the basis of the feel of the finger.

In the coordinate input device according to the present embodiment, the operation surface is formed in a convex shape, and the coordinate input operation is performed by sliding the finger on the operation surface. Accordingly, operational feel close to that of the rotating ball device (trackball device) can be obtained. However, in the coordinate input device according to the present embodiment, a relatively large and heavy ball used in the rotating ball device is not necessary and the height can be reduced to half of the diameter of the ball or less, so that the size, especially the thickness, of an electronic apparatus in which the coordinate input device is mounted can be reduced.

Figure 4:
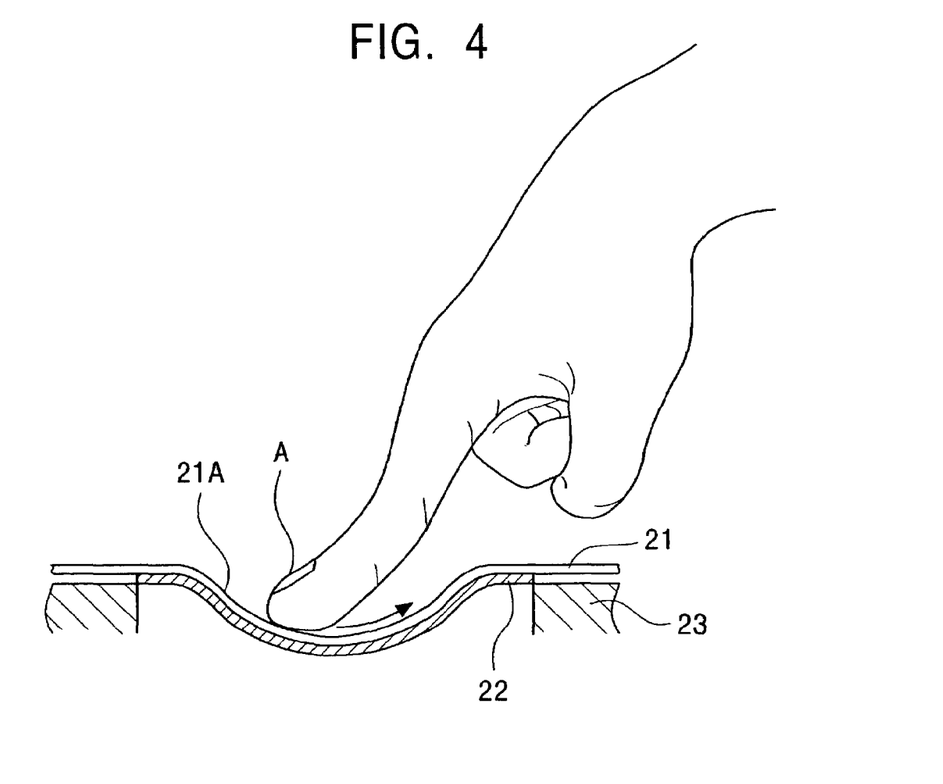
FIG. 4 is a sectional view showing a coordinate input device according to another modification of the first embodiment of the present invention.

Although the coordinate input device having the operation surface formed in a convex shape is shown in FIGS. 1 and 2A-2C, the coordinate input device according to the present invention may also have an operation surface formed in a concave shape. FIG. 4 shows a coordinate input device having an operation surface formed in a concave shape. In the coordinate input device shown in FIG. 4, a cover 21 is provided with a concave portion 21A, and a sensor substrate 22 is disposed behind the concave portion 21A and is supported by a base 23. The top surface of the concave portion 21A serves as the operation surface for the coordinate input operation. The cover 21 and the sensor substrate 22 are constructed similarly to the cover 11 and the sensor substrate 12 shown in FIG. 1 except for the concave portion 21A forming the operation surface, and operations and functions thereof are also similar. Accordingly, detailed explanations thereof are omitted.

Like the coordinate input device shown in FIG. 1, when the coordinate input device shown in FIG. 4 is used, since the operation surface is concave and not flat, the user obtains not only the sense of two-dimensional movement but also the sense of vertical movement along the curved surface when he or she slides the operating member A, such as a finger, on the operation surface to perform the coordinate input operation. Thus, the feel of sliding the operating member A can be more easily obtained. Accordingly, also when the coordinate input device shown in FIG. 4 is used, the user can easily follow the amount and direction of cursor movement in accordance with the amount and direction of finger movement, and the cursor can be controlled more finely. Therefore, an excellent operational feel can be obtained.

As described above, according to the coordinate input device of the present embodiment, an operational feel similar to that of the known rotating ball device can be obtained, and the problem of thickness and weight of the rotating ball device can be solved.

In addition, as shown in FIG. 3B, a flat region 19 formed at the periphery may be used for providing an additional function other than the normal coordinate input function. In this case, since the curved portion and the flat portion can be clearly distinguished from each other, regions assigned to such an additional function can be easily found compared to when the operation surface is entirely flat. Accordingly, even when touch typing is performed, misoperation can be prevented. When the coordinate input device is used in a notebook computer, the additional function may be, for example, a screen-scroll function.

Although the capacitive coordinate input device in which the present invention is applied is described above with reference to FIGS. 1 to 3, the present invention may also be applied to any kind of coordinate input devices as long as the operation surface for sliding the operating member is provided. For example, the present invention may of course be applied to contact coordinate input devices, as illustrated in FIG. 3A, in which a pair of substrates 14A and 15A are disposed such that they oppose each other with a spacer S therebetween, the substrates being provided with electrode layers 16A and 17A on surfaces opposing each other. In such contact coordinate input devices, a coordinate is detected by pressing one of the substrates 14A, 15A by an operating member, such as a finger, and bringing the electrode layers 16A and 17A into contact with each other. In addition, according to the present invention, the operating member is not limited to the finger, and any kind of operating members may be used as long as it can be slid on the operation surface of the coordinate input device. For example, a pen-type operating member may also be used.

Second Embodiment

Figure 5:
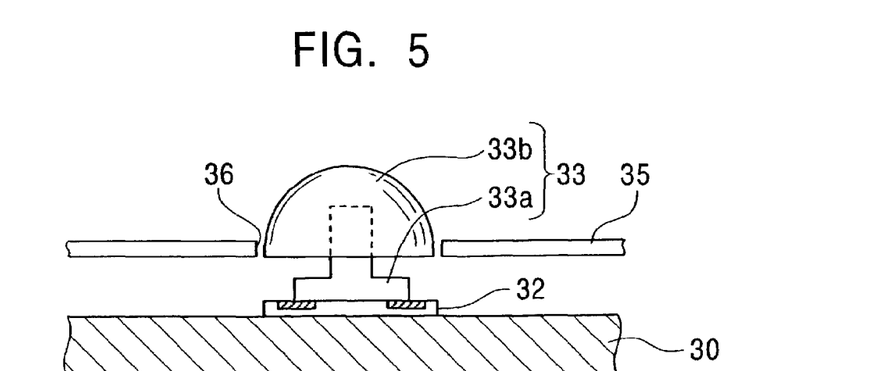
FIG. 5 is a sectional view showing a coordinate input device according to a second embodiment of the present invention.
Figure 6:
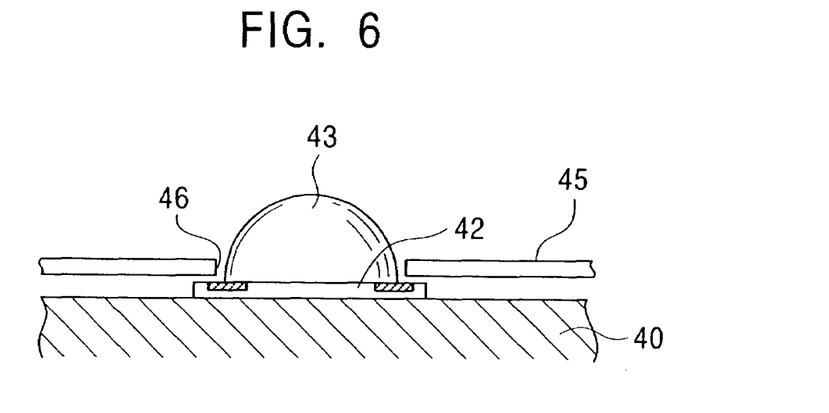
FIG. 6 is a sectional view showing a coordinate input device according to a modification of the second embodiment of the present invention.
Figure 7:
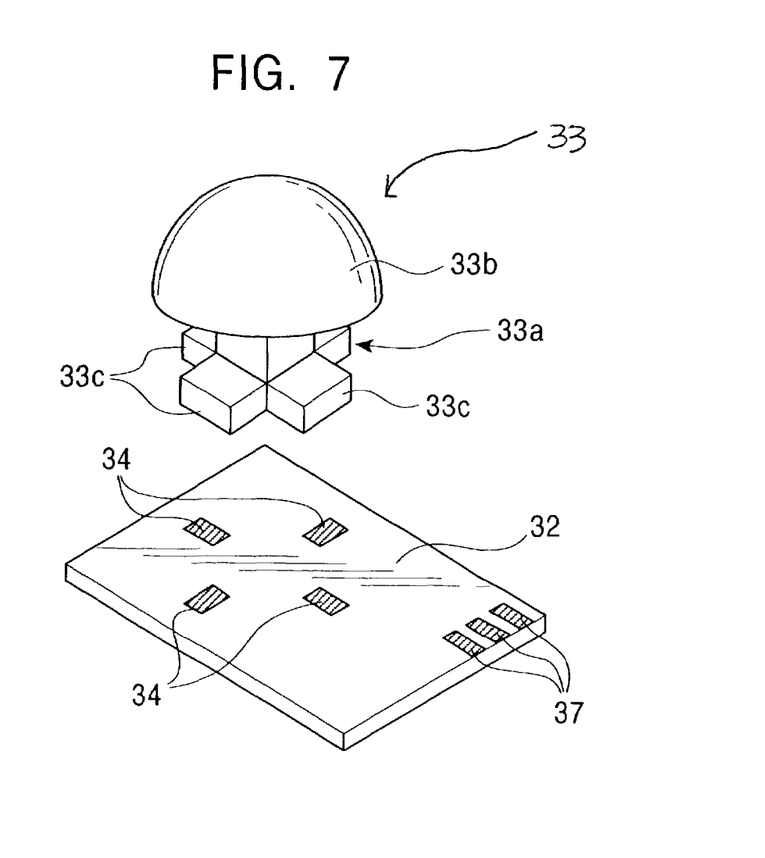
FIG. 7 is a perspective view showing the coordinate input device shown in FIG. 4.

Next, a second embodiment of the present invention will be described below with reference to FIGS. 5 to 7. FIG. 5 is a sectional view of a coordinate input device according to the second embodiment, and FIG. 6 is a sectional view of a coordinate input device according to a modification of the second embodiment. FIG. 7 is a perspective view of the coordinate input device shown in FIG. 5.

The coordinate input device shown in FIGS. 5 and 7 includes a detection sensor unit 32 formed on a base 30 and an operation unit 33 formed on the detection sensor unit 32. The operation unit 33 includes a base plate 33a and a hemispherical operation member 33b which is attached on top of the base plate 33a. The coordinate input device is installed inside a housing 35 such that the upper side of the operation member 33b projects outside through a hole 36 formed in the housing 35.

In addition, as shown in FIG. 7, the detection sensor 32 includes four strain gauges 34 which are arranged at a constant interval such that the center of the strain gauges 34 is placed directly under the center of the bottom surface of the base plate 33a. The strain gauges 34 are electronically connected to output terminals 37 by electric wires (not shown). In addition, four legs 33c formed at the four sides of the base plate 33a are placed on each of the strain gauges 34.

In the coordinate input device according to the present embodiment which is constructed as described above, the top surface of the operation member 33b serves as the operation surface. When an operating member, such as a finger, slides on the operation surface, a pushing force is applied to the operation member 33b and the strain gauges 34 of the detection sensor unit 32 are deformed. Then, a two-dimensional output signal corresponding to the amount of deformation are output through the output terminals 37, and a coordinate input process is performed on the basis of the output signal.

Similarly to the coordinate input device according to the first embodiment, when the coordinate input device according to the present embodiment is used, since the operation member 33b including the operation surface is convex upward, the user obtains not only the sense of two-dimensional movement but also the sense of vertical movement along the curved surface when he or she slides his or her finger on the operation surface to perform the coordinate impute operation. Thus, the amount by which the user has moved his or her finger on the operation surface can be easily recognized from the feel of the finger. Accordingly, the user can easily follow the amount and direction of cursor movement in accordance with the amount and direction of finger movement, and the cursor can be controlled more finely.

In addition, the coordinate input device shown in FIG. 6 includes a detection sensor unit 42 formed on a base 40 and a hemispherical operation unit 43 disposed on the detection sensor unit 42. The coordinate input device is installed inside a housing 45 such that the upper side of the operation unit 43 projects outside through a hole 46 formed in the housing 45. In addition, although not shown in FIG. 6, the detection sensor 42 includes four strain gauges similar to those of the detection sensor unit 32 shown in FIG. 7 the four strain gauges are arranged at a constant interval in a manner similar to FIG. 7, and the operation unit 43 is disposed such that the bottom surface thereof overlaps the strain gauges.

The coordinate input device shown in FIG. 6 differs from that shown in FIG. 5 in that the strain gauges of the detection sensor unit 42 are pushed by the bottom surface of the hemispherical operation unit 43. The operating principal and the operating method are the same as those of the coordinate input device shown in FIG. 5. Accordingly, the coordinate input device shown in FIG. 6 also provides an excellent operational feel similarly to the coordinate input device shown in FIG. 5.

Figure 8:
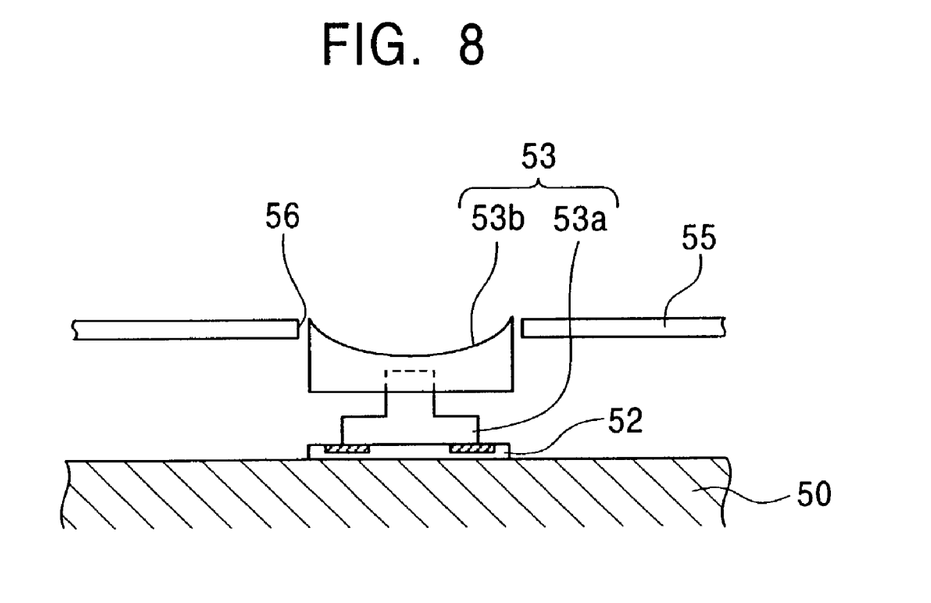
FIG. 8 is a sectional view showing a coordinate input device according to another modification of the second embodiment of the present invention.
Figure 9:
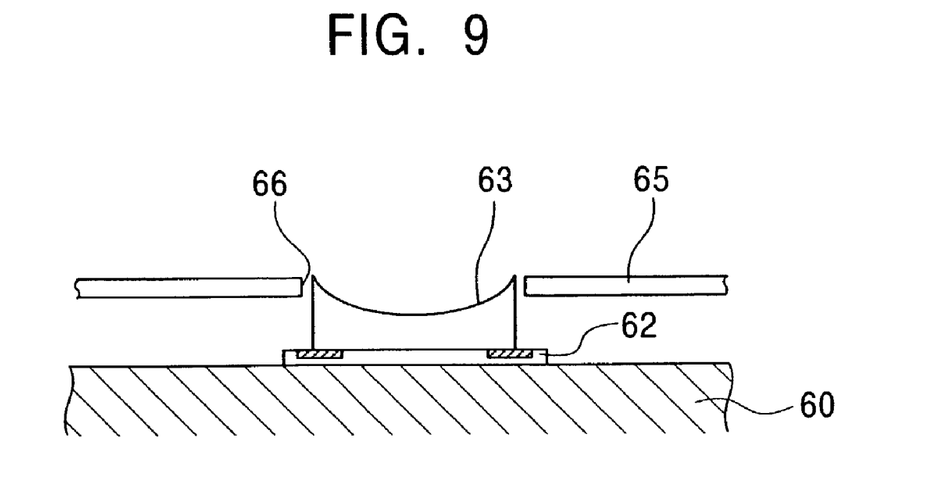
FIG. 9 is a sectional view showing a coordinate input device according to another modification of the second embodiment of the present invention.

Although the coordinate input device having the operation surface formed in a convex shape is shown in FIGS. 5 to 7, the coordinate input device according to the present invention may also have an operation surface formed in a concave shape. FIGS. 8 and 9 are sectional views showing coordinate input devices according to the present invention having an operation surface formed in a concave shape. In FIGS. 8 and 9, reference numerals 50 and 60 show bases, 52 and 62 show detection sensor units, 53 and 63 show operation units, 53a shows a base plate, 53b shows an operation member, 55 and 65 show housings, and 56 and 66 show holes formed in the housings 55 and 65. Since the coordinate input devices shown in these figures are constructed similarly to those shown in FIGS. 5 and 6 except for the shape of the operation units 53 and 63, detailed explanations thereof are omitted.

The coordinate input devices shown in FIGS. 8 and 9 are characterized in that the top surface of the operation member 53b and the top surface the operation unit 63, the top surfaces being formed in a concave shape, are used as the operation surfaces. Since the operation surfaces are formed in a concave shape, similarly to the coordinate input devices shown in FIGS. 5 and 6, the user obtains not only the sense of two-dimensional movement but also the sense of vertical movement along the curved surface when he or she slides his or her finger on the operation surface to perform the coordinate impute operation. Thus, the feel of sliding the finger can be more easily obtained. Accordingly, also when the coordinate input devices shown in FIGS. 8 and 9 are used, the user can easily follow the amount and direction of cursor movement in accordance with the amount and direction of finger movement, and the cursor can be controlled more finely. Therefore, an excellent operational feel can be obtained.

Electronic Apparatuses

Next, electronic apparatuses according to the present invention will be described below with reference to the accompanying drawings. However, the coordinate input device of the present invention is not limited to be used in the following electronic apparatuses. The following electronic apparatuses include a coordinate input device according to one of the above-described embodiments.

Controller for Game Device

Figure 10:
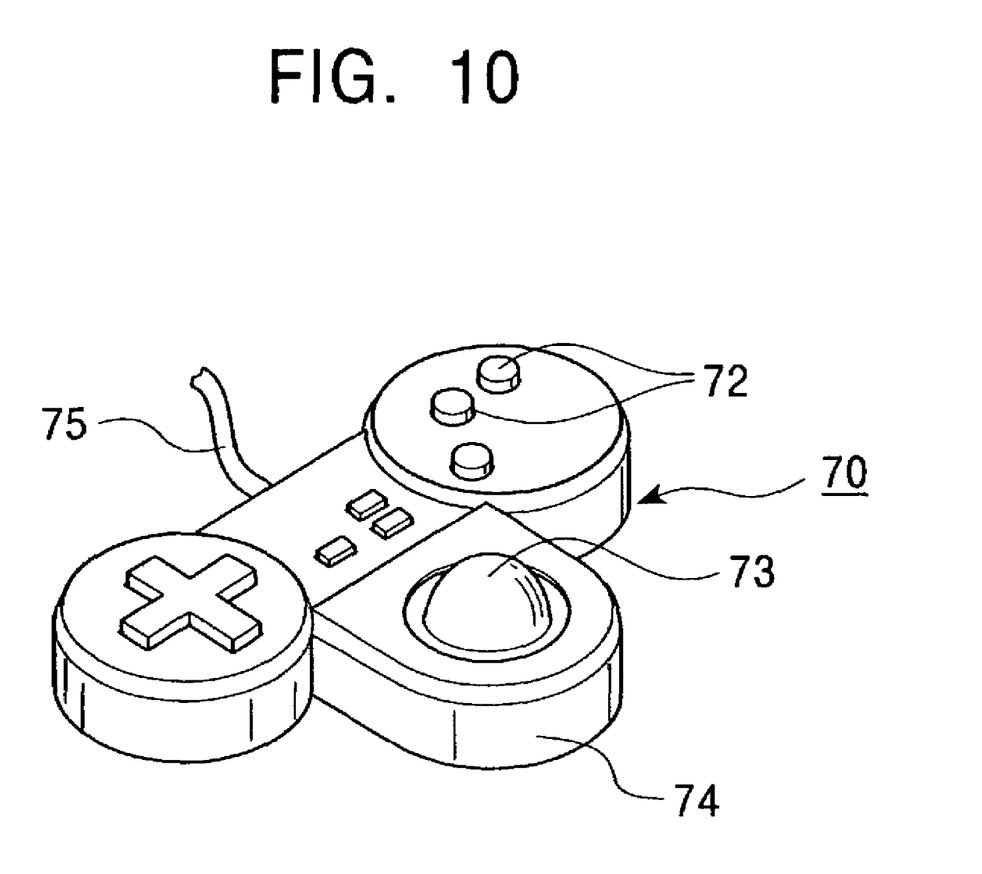
FIG. 10 is a diagram showing a controller for a game device as an example of an electronic apparatus according to the present invention.

FIG. 10 is a perspective view showing a controller for a game device in which the coordinate input device according to the present invention is mounted. With reference to FIG. 10, a controller 70 for a game device is constructed by arranging a coordinate input unit 73 used for performing a coordinate input operation, for example, an operation of inputting a moving direction, and a plurality of button switches 72 on a housing 74. In addition, a connecting cable 75 for providing connection with the game device (not shown) is connected to the housing 74.

The coordinate input unit 73 of the controller 70 shown in FIG. 10 contains the coordinate input device according to the present invention, and the game device can be operated by sliding a finger on the coordinate input unit 73. Since the coordinate input unit 73 of the controller 70 constructed as described above includes the coordinate input device of the present invention which has an excellent operational feel, the coordinate input operation can be easily performed.

Mobile Phone

Figure 11:
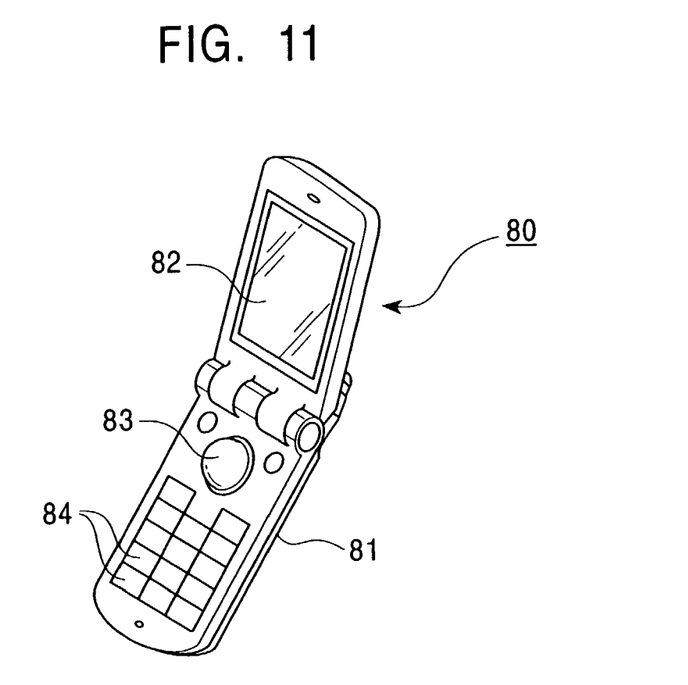
FIG. 11 is a diagram showing a mobile phone as another example of an electronic apparatus according to the present invention.

FIG. 10 is a perspective view showing an example in which the coordinate input device according to the present invention is used in a mobile phone. With reference to FIG. 11, a mobile phone 80 includes a display 82 disposed at one side of a housing 81, a coordinate input unit 83 disposed in front of the display 82, and a plurality of operation buttons 84 arranged in front of the coordinate input device 83. The coordinate input unit 83 of the mobile phone 80 includes the coordinate input device according to the present invention.

According to the mobile phone 80 which is constructed as describe above, an operation of selecting an object or function shown on the display 82, etc., can be more easily performed by sliding a finger on the coordinate input unit 83.

Mobile Information Terminal

Figure 12:
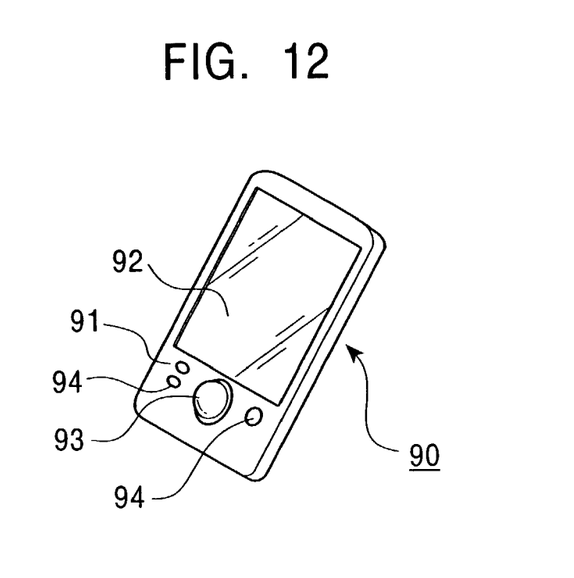
FIG. 12 is a diagram showing a mobile information terminal as another example of an electronic apparatus according to the present invention.

FIG. 12 is a plan view showing an example in which the coordinate input device according to the present invention is used in a mobile information terminal. With reference to FIG. 12, a mobile information terminal 90 includes a display 92 which is disposed on a housing 91, a coordinate input unit 93 which is disposed at a central region in front of the display 92, and a plurality of operation buttons 94. The coordinate input unit 93 of the mobile information terminal 90 includes the coordinate input device according to the present invention.

According to the mobile information terminal 90 which is constructed as described above, an operation of selecting an object or function shown on the display 92, etc., can be more easily performed by sliding a finger on the coordinate input unit 93.

Notebook Computer

Figure 13:
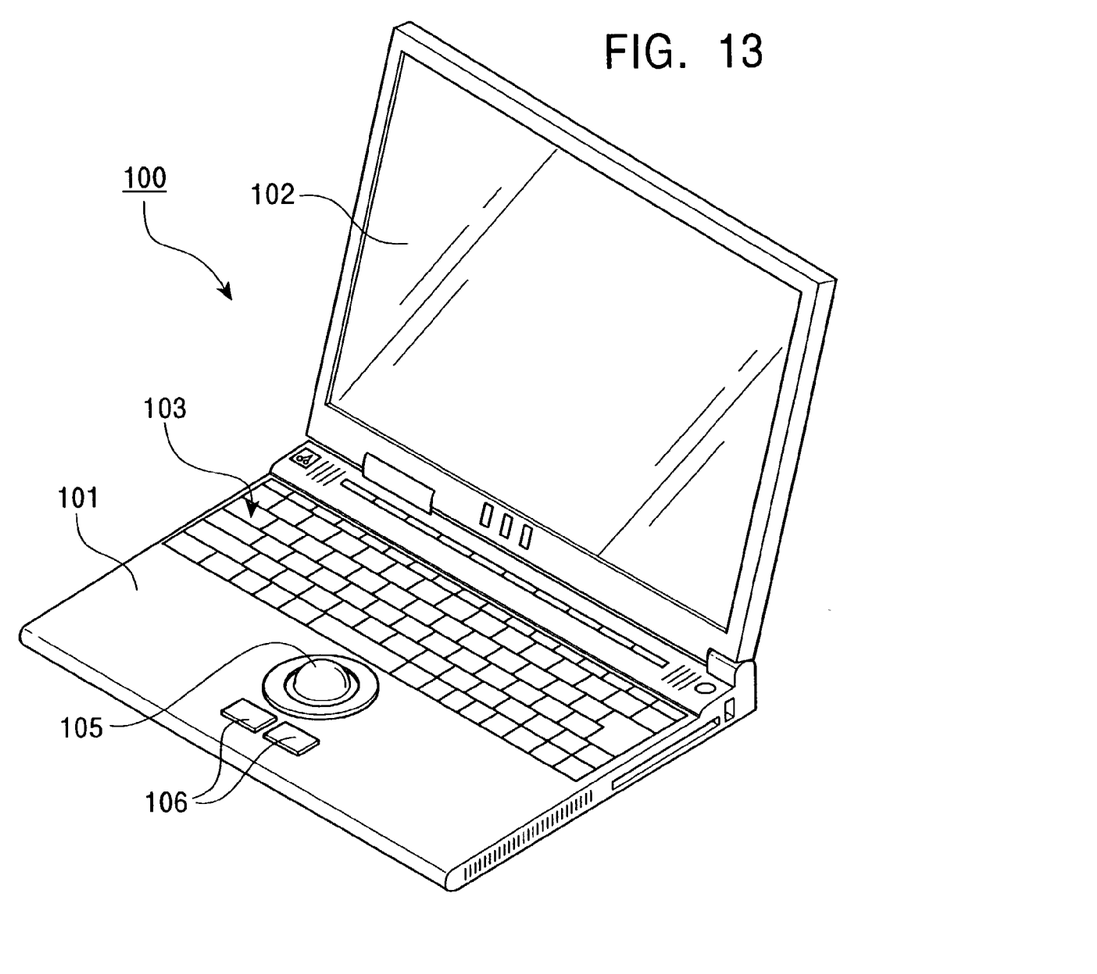
FIG. 13 is a diagram showing a notebook personal computer as another example of an electronic apparatus according to the present invention.

FIG. 13 is a perspective view showing an example in which the coordinate input device according to the present invention is used in a notebook personal computer. With reference to FIG. 13, a notebook personal computer 100 includes a main body 101 and a display 102 which is connected to the main body 101 by a hinge at the rear end of the main body 101. The main body 101 is provided with a keyboard 103, a coordinate input unit 105 disposed in front of the keyboard 103, and a plurality of push button switches 106 are disposed in front of the coordinate input unit 105. The coordinate input unit 105 includes the coordinate input device according to the present invention.

According to the computer 100 which is constructed as describe above, since the coordinate input unit 105 includes the coordinate input device according to the present invention, operations of moving a cursor shown on the display 102, selecting an object, etc., can be performed more easily. Accordingly, an operation feel similar to that of a known computer having a rotating ball device can be obtained, and the thickness and weight of the computer can be reduced compared to a computer having a rotating ball device.

Remote Controller

FIG. 14 is a perspective view showing a case in which the coordinate input device according to the present invention is used in a remote controller. With reference to FIG. 14, a remote controller 110 includes an infrared light emitting unit 116 disposed at an end of a housing, a coordinate input unit 115 disposed on the housing, and a plurality of operation buttons 113. The coordinate input unit 115 includes the coordinate input device according to the present invention.

The remote controller 110 can be suitably used for, for example, a television set, a video tape recorder, a car navigation system, etc., and an operation of selecting a function shown in a display of these electronic apparatuses, etc., can be performed more easily.

What is claimed is:

1. A coordinate input device comprising:
   coordinate input means which performs a coordinate input operation by detecting a position of an external operating member that contacts a non-rotating operation surface when the external operating member slides on the non-rotating operation surface, wherein a flat base supports the non-rotating operation surface and is disposed under the non-rotating operation surface;
   wherein the non-rotating operation surface is capable of having a plurality of shapes and the non-rotating operation surface is formed in a convex shape, a concave shape, or the shape of a polyhedron, and
   wherein the non-rotating operation surface is convex or concave at the side at which the operating member slides thereon;
   wherein the coordinate input means comprises a capacitive sensor substrate which is formed in one of a convex shape, a concave shape and the shape of a polyhedron, and which includes a dielectric layer and two electrode layers which are laminated with the dielectric layer therebetween, each electrode layer having a plurality of electrodes arranged in a pattern.

2. A coordinate input device according to claim 1, wherein the periphery of the non-rotating operation surface is formed in a rectangular shape with straight sides.

3. A coordinate input device according to claim 2, wherein the non-rotating operation surface includes a flat region at the periphery thereof.

4. A coordinate input device according to claim 3, wherein the flat region is assigned to a particular function other than the coordinate input operation.

5. An electronic apparatus comprising a coordinate input device according to claim 1.

6. A coordinate input device, comprising:
   coordinate input means performing a coordinate input operation by detecting a position of an external operating member that contacts a non-rotating operation surface when the operating member pushes and slides on the non-rotating operation surface to produce a two-dimensional movement and a vertical movement,
   wherein the non-rotating operation surface is capable of having a plurality of shapes and the non-rotating operation surface is formed in a convex shape, a concave shape, or the shape of a polyhedron and includes a pair of substrates, a pair of electrode layers disposed between the pair of substrates and opposing each other and a spacer disposed between the pair of electrode layers.

7. The coordinate input device according to claim 6, wherein when the operating member presses or slides on the non-rotating operation surface, the pair of electrode layers contact with each other.

* * * * *